United States Patent [19]
Reil et al.

[11] Patent Number: 5,103,988
[45] Date of Patent: Apr. 14, 1992

[54] FLUID PACK WITH GRIPPING RECESSES AND PROCESS FOR PRODUCING SAME

[75] Inventors: Wihelm Reil, Bensheim; Ulrich Deutschbein, Multhal; Gerd Knobloch, Greisheim; Udo Liebram, Pfungstadt, all of Fed. Rep. of Germany; Bengt Eckerwall, La Conversion, Switzerland

[73] Assignee: Tetra Pak Holdings & Finance S.A., Pully, Switzerland

[21] Appl. No.: 657,651

[22] Filed: Feb. 19, 1991

[30] Foreign Application Priority Data

Feb. 20, 1990 [DE] Fed. Rep. of Germany ....... 4005257

[51] Int. Cl.⁵ .................................................. B65D 23/10
[52] U.S. Cl. .................................. 215/100 A; 220/94 A
[58] Field of Search ....................... 220/94 A, 94 R; 229/117.12, 125.14, 106, 107; 215/100 A; 222/465.1

[56] References Cited

U.S. PATENT DOCUMENTS

| | | | |
|---|---|---|---|
| 1,599,967 | 9/1926 | Johnson | 222/465.1 |
| 3,081,010 | 3/1963 | Tupper | 222/465.1 |
| 3,232,495 | 2/1966 | Schneider | 215/100 A |
| 3,390,827 | 7/1968 | Malby et al. | 229/117.12 |
| 4,016,995 | 4/1977 | Frazer | 215/100 A |
| 4,327,861 | 5/1982 | Thompson | 215/100 A |
| 4,372,455 | 2/1983 | Cochran | 215/100 A |
| 4,671,452 | 6/1987 | Pupp et al. | 220/94 A |
| 4,804,134 | 2/1989 | Reil | 229/125.14 |

FOREIGN PATENT DOCUMENTS

| | | |
|---|---|---|
| 0144736 | 6/1985 | European Pat. Off. . |
| 0303788 | 2/1989 | European Pat. Off. . |
| 1867842 | 12/1962 | Fed. Rep. of Germany . |
| 1561529 | 5/1970 | Fed. Rep. of Germany . |
| 1586793 | 8/1970 | Fed. Rep. of Germany . |
| 2210013 | 9/1973 | Fed. Rep. of Germany.. |
| 3612895 | 4/1986 | Fed. Rep. of Germany . |
| 3439492 | 5/1986 | Fed. Rep. of Germany . |
| 3606280 | 9/1987 | Fed. Rep. of Germany . |
| 3628478 | 3/1988 | Fed. Rep. of Germany . |
| 3809275 | 10/1989 | Fed. Rep. of Germany . |
| 3835390 | 4/1990 | Fed. Rep. of Germany . |
| 1565792 | 3/1969 | France . |
| 1129877 | 10/1968 | United Kingdom . |

*Primary Examiner*—Gary E. Elkins
*Attorney, Agent, or Firm*—Joseph G. Nauman

[57] ABSTRACT

Described is a liquid pack comprising a tube (1) with a bottom and a top (7) disposed at the ends thereof, wherein the top (7) comprises thermoplastic material, is injection-moulded on the tube (1) and has a pouring means (8). The bottom is quadrangular and in the form of a folded closure formed from the folded-over tube (1) of the pack. A handle (11) which is connected to the top (7) is disposed in such a way that the handle (11, 17) together with the top (7) is arranged within the parallelepipedic outside contour of the pack. In order to provide a better handle in a simpler configuration with a large number of packs per unit of time, the invention provides that the tube (1) is formed from a plastics foil in which there are formed two mutually oppositely disposed gripping recesses (11) which, starting from the top (7), extend into the middle region (18) of the pack, and the cross-section of the pack in its upper portion with the gripping recesses (11) substantially corresponds to the shape of the top (7), the periphery of which is substantially as long as the periphery of the pack in the vicinity of its bottom.

9 Claims, 10 Drawing Sheets

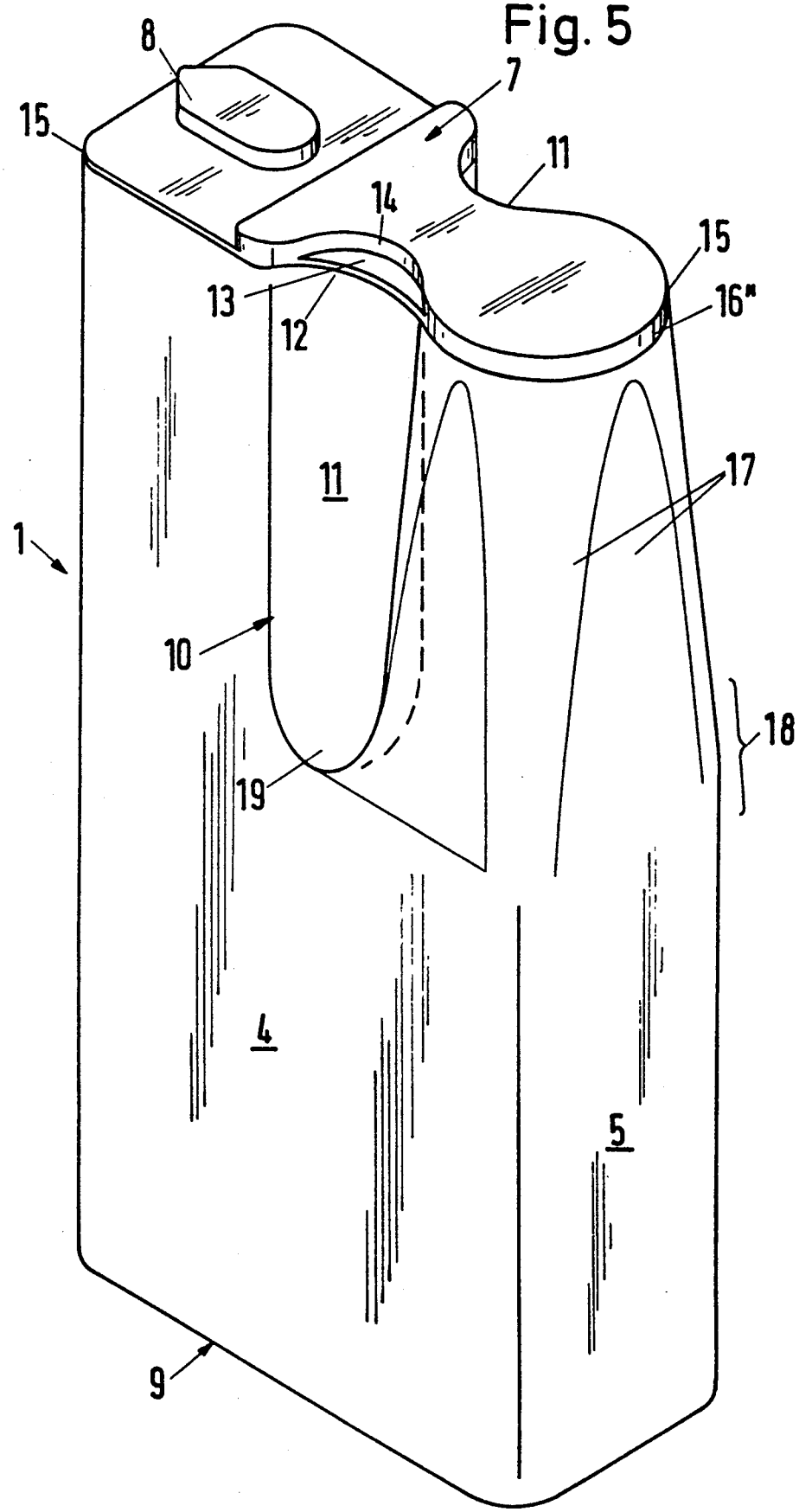

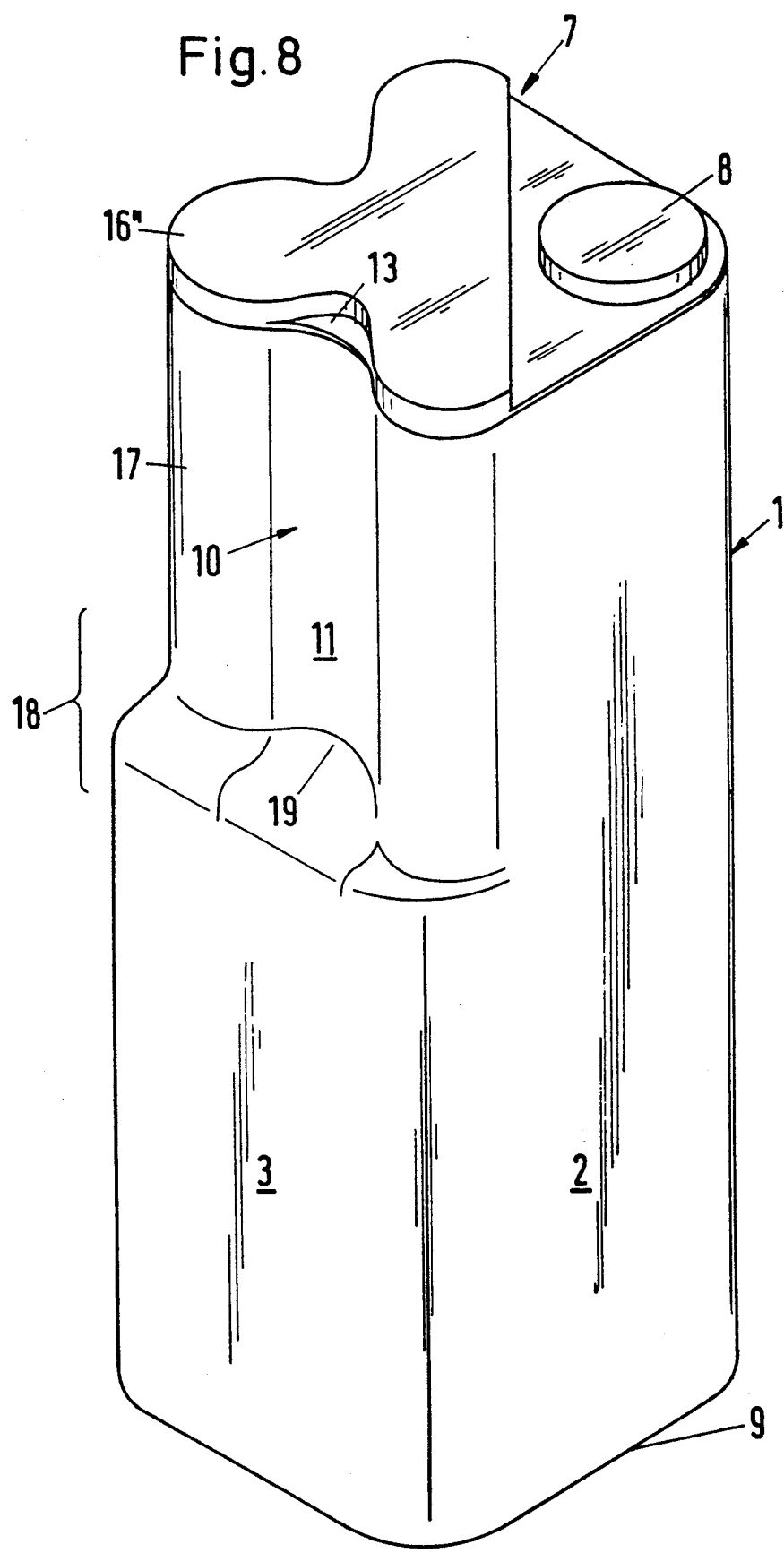

FLUID PACK WITH GRIPPING RECESSES AND PROCESS FOR PRODUCING SAME

BACKGROUND OF THE INVENTION

The invention relates to a pack for filling with materials which are capable of flow, comprising a tube which is formed by at least one longitudinal sealing seam and disposed at the ends of which are a bottom and a top of which the top comprises thermoplastic material without a backing material, is injection-moulded on the tube and has a pouring means, and the bottom is quadrangular and is in the form of a folded closure formed from the folded-over tube of the pack, wherein a handle which is connected to the top is provided laterally on the tube beneath the top in such a way that the handle together with the top is arranged within the parallelepipedic outside contour of the pack.

In packs of known kind, the tube comprises backing material, for example cardboard or paper, which is coated with thermoplastic material on both sides. It is known that that paper tube can only be folded so that a top, a pouring means in the top, a handle and like configurations cannot be produced by simple folding with simple production machinery so that those parts are injection-moulded on the tube, with injection moulds of a suitable configuration. Comparatively expensive tools are required for that purpose, and paper is also lost on the blank, due to double folding, stamping-out or the like.

In addition, with known packs of that kind, with a paper tube and a handle which is injection-moulded thereon from thermoplastic material, it has been found that in the course of mass production of such products, it was necessary to provide short flow paths for the liquid thermoplastic material, with the result that the handle which is injection-moulded in position in that way is in a disadvantageous position relative to the centre of gravity of the pack. Particularly in the case of larger packs of a volume of 1 liter, 2 liters and the like, it has been found that, with short flow paths in the production machine, a handle is too far away from the centre of gravity in an upward direction in the vicinity of the top. That makes it more difficult for the final consumer to pour from the pack because it is only with difficulty that that handle which is formed too far upwardly on the top can raise the lower portion of the pack for pouring therefrom, in particular when the pack gradually empties. In addition, in the pouring-out operation, the loading applied to the handle of that known pack is high so that the really small connecting regions between the handle and the paper tube are very heavily loaded and occasionally tear away.

Therefore the problem of the present invention is that of developing a pack of the kind set forth in the opening part of this specification, and a process for producing same, in order to provide a better handle in a configuration which is simpler as far as possible, with a large number of items per unit of time.

SUMMARY OF THE INVENTION

According to the invention that problem is solved in that the tube is formed from a plastics foil and formed into same are two mutually oppositely disposed gripping recesses which, starting from the top, extend into the middle region of the pack, and that the cross-section of the pack in its upper portion with the gripping recesses substantially corresponds to the shape of the top, the periphery of which is substantially as long as the periphery of the pack in the vicinity of its bottom.

Admittedly, in accordance with the invention, a tube is formed as in the case of the known pack, and a top of plastics material without backing material is also injection-moulded to the upper edge of the tube, as in the case of the known pack. In accordance with the invention however the material for the tube is a plastics foil which permits gripping recesses or troughs to be shaped therein by means of simple tools, thus making it possible to provide a handle which is disposed at a better location and which can carry a higher loading. More specifically, as in the case of other known plastics packs, the final consumer can put the fingertips into the gripping recesses or troughs and grip the support pillar which is disposed between the fingers, at the side remote from the pouring means, in order to hold the pack and tilt it for pouring it out. The volume of the pack is only immaterially reduced by virtue of the gripping recesses. In the initially mentioned pack, the injection-moulded handle was disposed in a tetrahedral space within the overall outside contour of the pack, wherein a part of that tetrahedral volume was not even absolutely necessary for gripping the pack, although it is nonetheless lost to the filling volume of the pack.

The cross-section of the pack, in the upper portion thereof with the gripping recesses, in particular at the upper ends of the gripping recesses, approximately corresponds to the configuration of the top. In that way it is possible for the upper edges of the tube, which are towards the top, to be guided along the edge of the top and there fixed in position. In the known packs with tops which are injection-moulded on the paper tube, the upper edge towards the top or the edge of the tube is also supported and retained by the top. In accordance with the invention the same support force of the top is used to fix the configuration of the upper ends of the gripping recesses, which are towards the top, without any need for special processing operations in respect of those upper ends of the gripping recesses. That affords the particular advantage that the pack according to the invention can be produced with conventional machines or at least with only minor modifications to such machines. The man skilled in the art is aware that pack producers use very expensive machinery and that it is a major advantage if it is possible to produce better packs with the old machines. Admittedly it would be possible to provide for thermoplastic processing of a plastics foil, but the man skilled in the art knows that such a shaping operation, for example a deep drawing operation, involves an additional production step and corresponding tools which could all be eliminated if the gripping recesses are produced only by folding at the upper end of the tube, towards the top, and they can be fixed in their folded labile form by injection moulding to the top of a corresponding configuration, and can be stabilised in respect of their shape in that way. To achieve that advantage and for the above-described configuration of the novel pack with the gripping recesses it is therefore also necessary for the periphery of the top to be substantially as long as the periphery of the pack in the vicinity of its bottom. In other words the outside periphery of the bottom is formed from the same tube as the outside periphery of the upper end of the tube in the region of the upper ends of the gripping recesses so that without plastic deformation of the tube at the bottom and at the top the periphery of the tube is of the same length and must also be of the same length in a corresponding fashion in regard to the pack.

In a further advantageous configuration of the invention the gripping recess or trough is in the form of part of a surface of a cylinder and is arranged between the front body of the pack under the pouring means on the one hand and a rear support pillar on the other hand. Admittedly it would be possible to provide gripping recesses of a V-shaped cross-section so that the two limbs of the V-shape (in cross-section in respect of the gripping recess) meet along a straight line. However such a gripping recess would not be particularly pleasant from the point of view of the final consumer, and it is for that reason that the part-cylindrical shape is preferred. The part-cylindrical shape of the gripping recess is disposed in the form of a depression or inwardly pressed portion on two mutually oppositely disposed sides in relation to a notional vertical plane therebetween, which is to be envisaged as extending through the longitudinal centre line of the pack on the one hand, forwardly through the middle of the pouring means on the other hand and thirdly rearwardly through the above-mentioned support pillar. The so-called rear support pillar is formed by the upper outer side walls in the upper portion of the pack opposite the pouring means and is defined in a forward direction towards the pouring means by the two gripping recesses. The final consumer fits the leading ends of the fingers into the gripping recesses and thus grips the support pillar in the inside of the hand. In an advantageous manner, just before opening such a pack, the volume of the filling material therein may even extend into the upper region of the support pillar. In that way the handle according to the invention, by virtue of the gripping recesses, is very advantageously located relative to the centre of gravity of the pack. The lower end of the gripping recesses could extend into the middle region of the pack or even lower for the high positioning of the known injection-moulded handle on the pack referred to in the opening part of this specification, to provide the short injection-moulding flow paths for the thermoplastic material, does not need to be taken into consideration in accordance with the invention. A handle formed by the gripping recesses according to the invention can also be subjected to a substantially higher loading and there are no punctiform, linear or small-area connections between the handle and the tube, which could tear away. That substantially improves the handle according to the invention.

It is further advantageous in accordance with the invention for the top to be substantially quadrangular, for the pouring means to be disposed in a front corner and for the support pillar to be disposed substantially under the rear corner of the top. Fluid packs can be in a widely varying range of configurations, but parallelepipedic packs are essentially considered here, in relation to preferred embodiments. The pouring means is generally arranged in the vicinity of an edge of the top in order to guarantee comfortable pouring. There are packs in which the pouring means is disposed between two corners or rounded-off corners of a top. In the particularly preferred embodiment described herein, the pouring means is disposed in a front corner of the top in per se known manner. Then, in accordance with the above-mentioned feature, in accordance with the invention, that provides that the support pillar is disposed substantially under the rear corner of the top. That also promotes advantageous positioning of the point of gripping on the part of the final consumer when pouring out the pack, in relation to the centre of gravity of the pack when completely or partially filled.

The exterior of the pack is particularly attractive if, in accordance with the invention, the corners of the top are rounded off. The gripping recesses or troughs are in the form of an outwardly open part-cylindrical surface which, in preferred embodiments, can in part be of a tapering configuration from the top downwardly towards the middle region. At any event, in handling the pack by means of the gripping recesses, the final consumer has the feeling that they provide tunnel-like curves and the whole exterior of the pack is even more attractive if the other parts of the upper portion of the pack are also in the form of part of a cylindrical surface in a corresponding fashion, more specifically by virtue of rounding-off of the edges of the tube of the pack, which is generally quadrangular in cross-section.

Such a pack can be produced by the same machines, except that instead of a web of paper, a plastics foil in web form or in sheet form is used for the pack according to the invention. The new handle is of such a shape that it remains within the whole outside contour of the pack. Thermoplastic shaping can be restricted to points or short lines in the middle region of the pack, preferably at the lower ends of the gripping recesses which are remote from the top.

Although the gripping means is very user-friendly by virtue of the gripping recesses according to the invention, the level of comfort involved in handling of the pack can be still further improved if, in accordance with the invention, an edge abutment is injection-moulded integrally to the edge of the top, at the upper end of at least one gripping recess. That edge abutment provides an abutment in an upward direction for the gripping fingers which are disposed in the gripping recess, for, in the event of a weak gripping pressure, the weight of the pack could cause the pack to slip downwardly relative to the hand or the fingers could slip up towards the upper end of the gripping recesses. If such an edge abutment is provided at one or even both gripping recesses, the fingers can positively hold the pack and there is the advantage that the gripping pressure no longer needs to be so great because the force for holding the pack not have to be produced simply by friction, by means of the gripping pressure.

The process for producing the pack set forth in the opening part of this specification is characterised in that a tube is formed from a plastics foil by means of welding of a longitudinal seam and is drawn on to a mandrel with trough-like depressions, the side walls of the tube in its upper portion are folded into the depressions, forming gripping recesses, the top is injection-moulded to the upper edge of the side walls and at the same time at least the lower ends of the gripping recesses in the middle region of the pack are heated, thermoplastically deformed and then cooled.

In the previously known pack with the handle injection-moulded thereon, admittedly a tube was also formed from the coated paper by means of welding of a longitudinal seam, and the tube was drawn on to a mandrel so that the top could be injection-moulded on to the upper edge of the side walls. At the same time however the handle was injection-moulded and resulted in the product described in the opening part of this specification, with certain disadvantages. The disadvantages are avoided with the process according to the invention, with an improvement in the gripping arrangement. The process is distinguished by a particular degree of simplicity. Known pack producing machines can be used for carrying out that process, predominantly without requiring conversion and otherwise requiring minor conversions only at a few points. The provision of trough-like depressions in a mandrel is a one-off matter which is easy to effect. Drawing a tube on to such a mandrel in which the trough-like depressions extend as far as possible in the direction of the drawing-on movement, that is to say in the longitudinal direction of the subsequent pack and in the longitudinal direction of the tube (also the longitudinal direction of the mandrel) is a simple operation. The outside periphery of the mandrel remains substantially equal in length over the entire height of the tube, even in the region of the trough-like depressions. They are so formed in the mandrel that the plastics tube can be fold-free fitted on to the surface of the mandrel if the inside surfaces of the tube bear against the outside surfaces of the mandrel of corresponding configuration. In that way the side walls of the tube are folded in without any problem in the upper region of the tube, whereby the gripping troughs are formed of their own accord, more specifically in the region of the trough-like depressions of the mandrel. The tube is held fast on the mandrel with suitable outside jaws, as in the case of the earlier machines, and a top is injected-moulded on to the upper edge of the side walls.

At the same time as the top is injection-moulded to the upper edge of the side walls or the edge of the tube, small surface portions of the tube side walls in the middle region of the pack are heated, thermoplastically deformed and then cooled in order to fix their shape. In a first embodiment, it is sufficient if the lower ends of the gripping recesses which are in fact disposed in the middle region of the pack are deformed in that way. In another second embodiment, both the lower ends of the gripping recesses and also adjacent regions in the middle area of the pack are deformed and fixed. What is involved in any case is providing the simple configuration of the gripping recesses using simple tools and without involving a great deal of time. If the gripping recess is of an elongate configuration, with its longitudinal direction extending substantially parallel to the longitudinal direction of the pack, then for fixing the desired final configuration of such a gripping recess it is sufficient for the two ends to be fixed. The upper end of the gripping recesses, which is towards the top, is fixed by virtue of the injection moulding operation for the top. The oppositely disposed lower or inner end of the gripping recesses in the middle region of the pack is fixed by the thermoplastic deformation and cooling effects. Because the top must in any case be injection-moulded to the tube, the single additional operation of processing the tube to provide a handle with corresponding technical advantages involves effecting thermoplastic shaping of the tube material in a region which is narrowly defined in terms of surface area. The man skilled in the art considers those regions which are closely defined in terms of surface area as a kind of spot for when heat is applied to a spot, heat is obviously also transmitted to regions around the spot. By heating a punctiform region it is therefore possible to provide for deep drawing of a plastics material which is capable of being deep drawn, at that location. That is precisely the procedure which in accordance with the invention makes it possible to fix the gripping recesses in a surprisingly simple fashion.

During the operation of injection-moulding the top and during the operation of thermoplastic shaping of the above-mentioned small-area spots, the other foil material of the deep-drawable plastics material remains cold. That means that very little energy is consumed. The thermoplastic shaping operation is effected in per se known manner by pressing or stretching into a predetermined from which precisely corresponds to the desired final shape of the lower ends of the gripping recesses.

Not only is the injection moulding operation simpler in comparison with the known pack and corresponding production processes, but also the tools, the production of such tools and the execution of the injection moulding operation are also simpler. Nonetheless it is possible to produce a product in the form of a pack with a gripping device which enjoys considerably improved stability in handling thereof.

As in the case of the known packs, the pack according to the invention may also be filled after the above-described processing operation through the subsequent bottom region, from below, and then closed by folding the bottom of the pack. In accordance with the invention, there is no longer any thermoplastic deformation in the bottom region. On the contrary the plastics foil in the bottom region is handled like the coated paper in the known production process. The web of plastics material may be pre-grooved in the bottom region of the subsequent pack in order to promote the subsequent folding operation to produce the bottom configuration. In that way it will be apparent that the pack producer can again use known existing machines.

In that connection, it is desirable in accordance with the invention if the middle region of two juxtaposed side walls of the tube including the lower ends of the gripping recesses, which ends are disposed in that area, are heated, thermoplastically deformed and then cooled. If for example a pack is to be made of such a design configuration that approximately the lower half is to occupy a larger volume than the upper half of the pack with the gripping means, then that inevitably results in a kind of step at least in the region of two juxtaposed side walls of the tube. The above-mentioned lower ends of the gripping recesses are advantageously disposed in that stepped region and then, using simple tools, only a small part of those two juxtaposed side walls can be thermoplastically deformed, namely only the region of the step for the transition from a large volume to a smaller volume, in which respect the length of the periphery for both regions must again be the same.

Further advantages, features and possible uses of the present invention will be apparent from the following description of preferred embodiments with reference to the accompanying drawings.

BRIEF DESCRIPTION OF THE DRAWINGS

FIG. 5 is a perspective view of a second embodiment of the pack viewing from obliquely above and rearwardly thereof, FIG. 8 is a perspective view of a third embodiment in a similar direction of view to that shown in FIG. 1, FIG. 10 is a plan view of the pack shown in FIG. 8 but with the pouring means arranged at top left.

DESCRIPTION OF THE PREFERRED EMBODIMENTS

Figure 1:
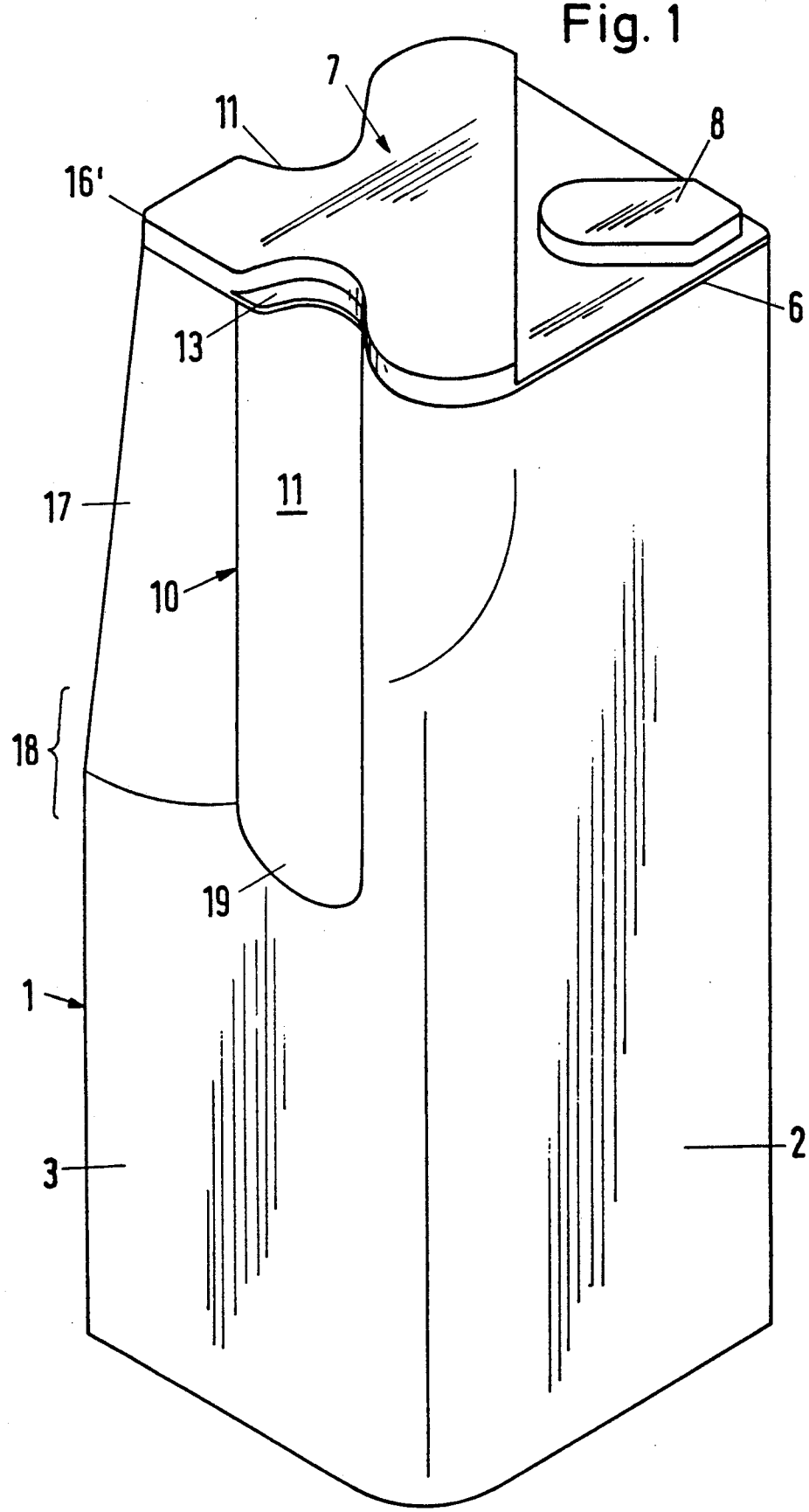
FIG. 1 is a perspective view from above of a first embodiment of the pack.
Figure 2:
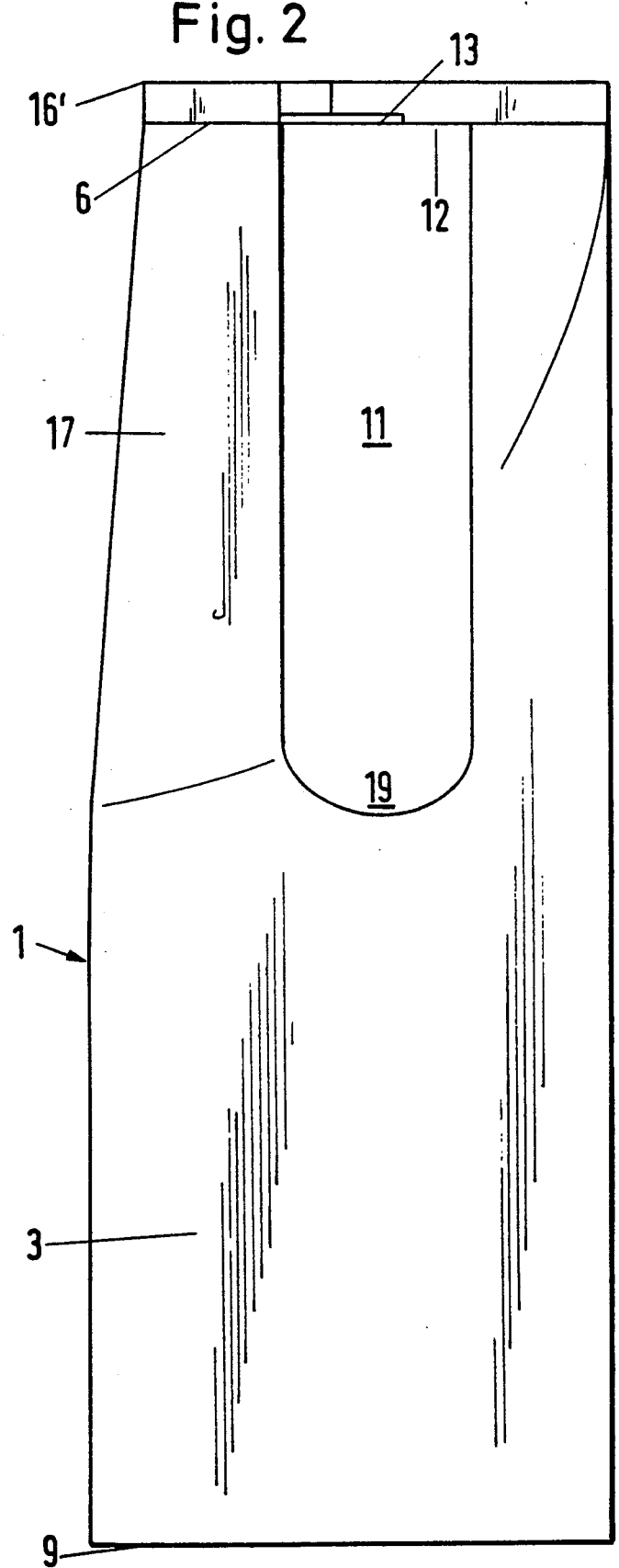
FIG. 2 is a side view of the pack viewing on to the front left-hand surface in FIG. 1.
Figure 3:
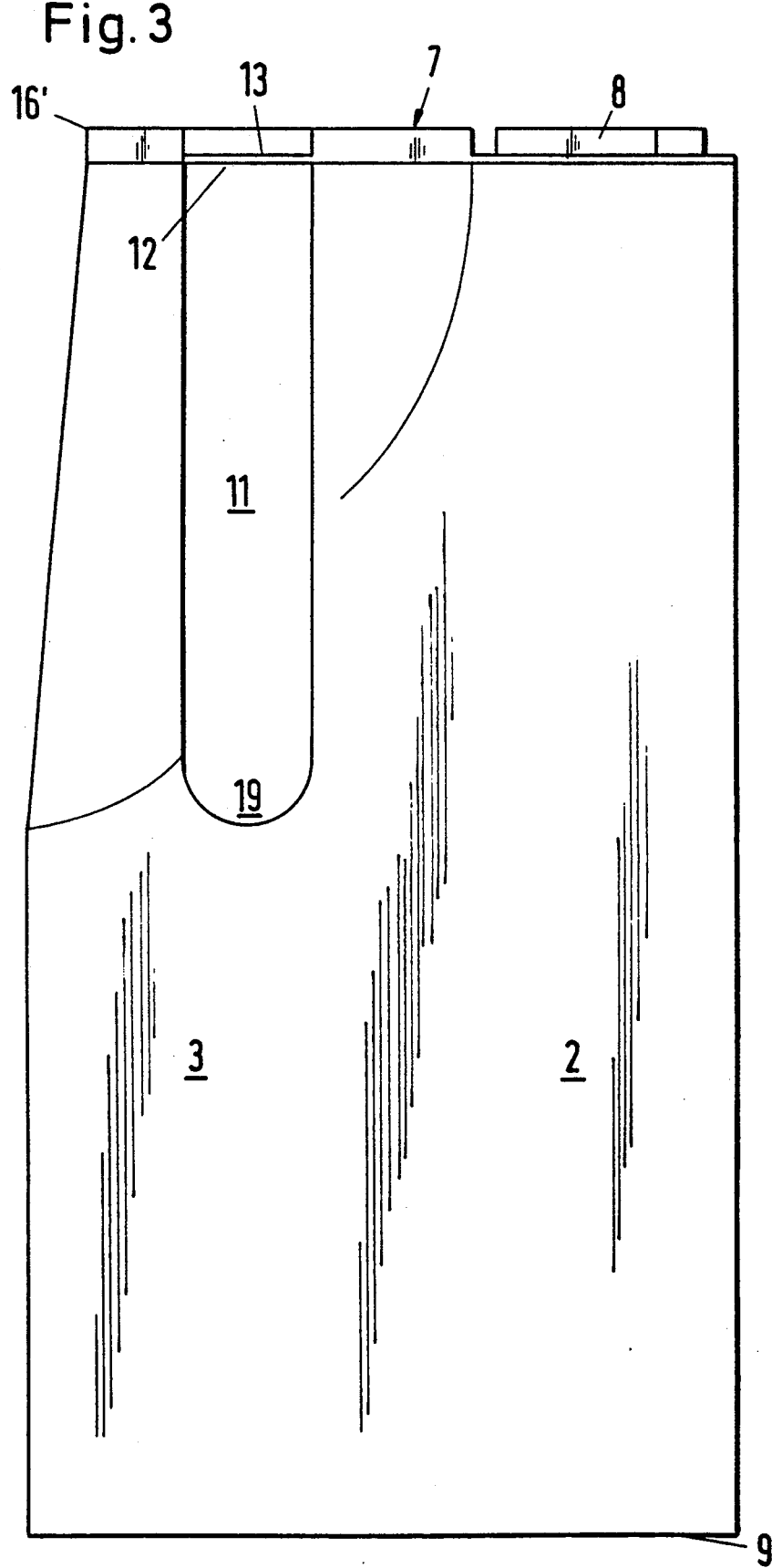
FIG. 3 is a side view of the pack when viewing in the direction of the diagonal which is in the direction of view when considering FIG. 1.

All three embodiments of the packs shown herein are suitable for liquids and have a tube 1 with side walls 2 to 5, the tube being formed by welding a longitudinal sealing seam (not shown). The respective upper edge 6 of the tube 1 is injection-moulded to the top 7 with pouring means 8. The bottom 9 is of a quadrangular configuration in cross-section or when viewing the pack from below and is in the form of a folded closure in a manner not shown in the drawing.

Figure 4:
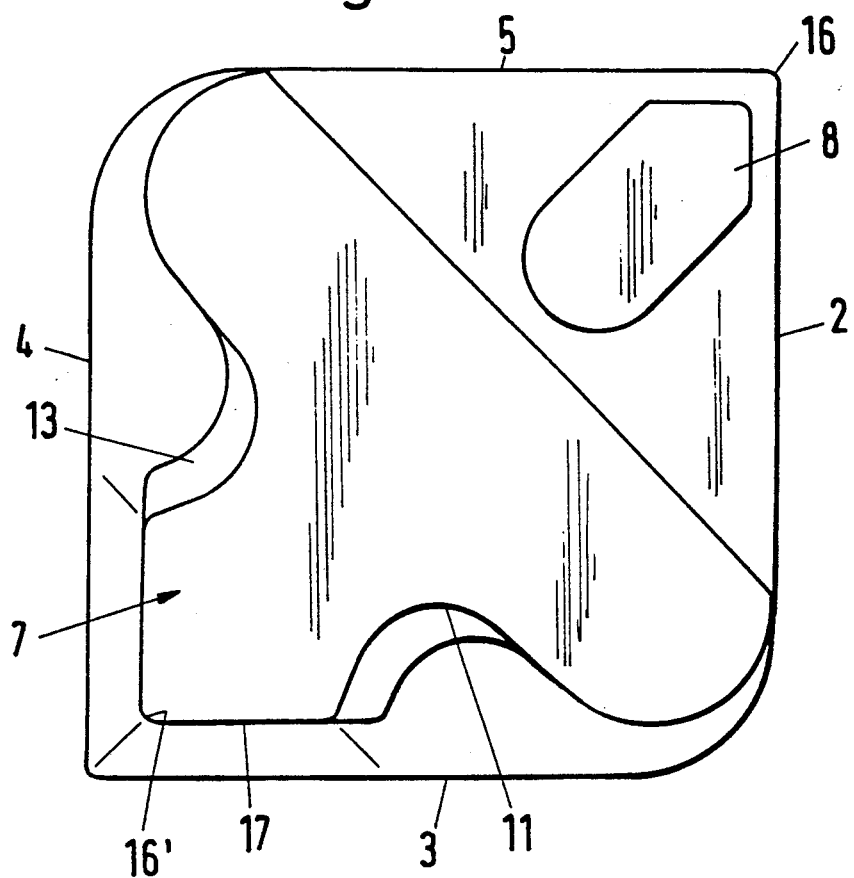
FIG. 4 is a plan view of the pack in the first embodiment.
Figure 7:
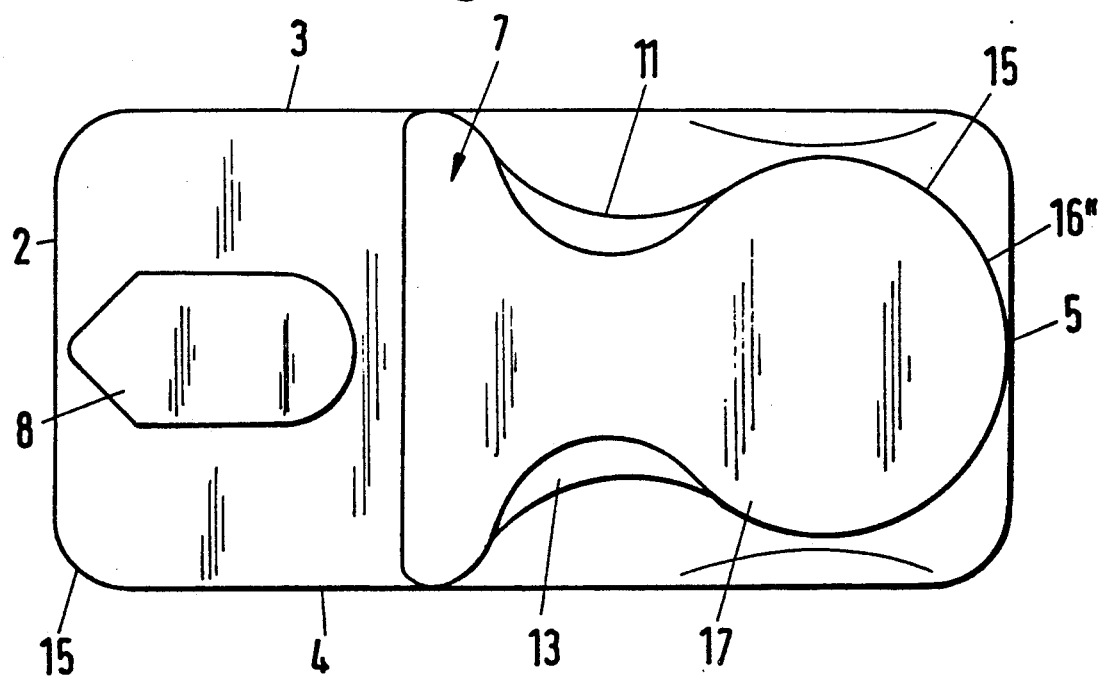
FIG. 7 is a plan view of the pack of the second embodiment shown in FIGS. 5 and 6.
Figure 6:
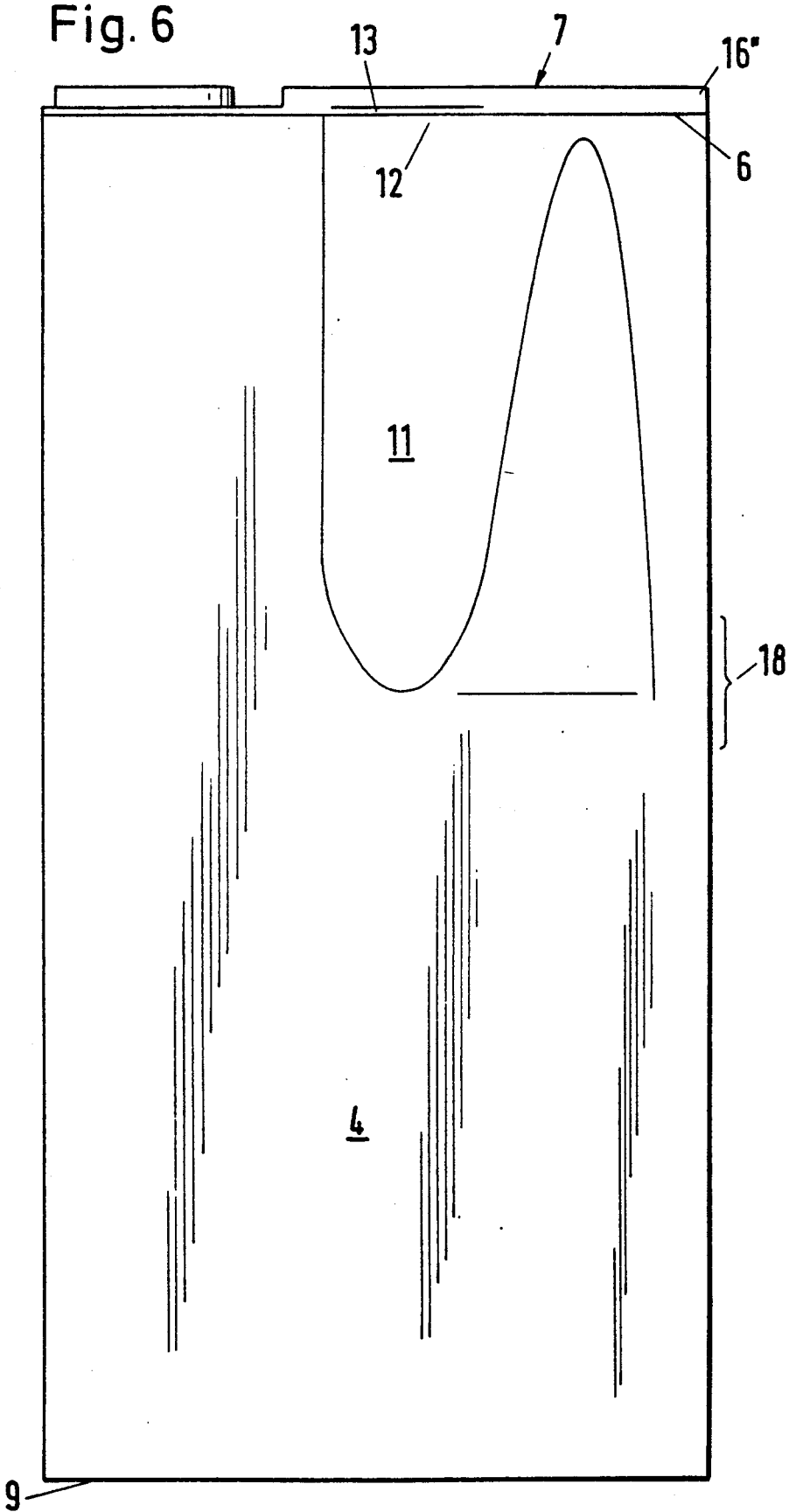
FIG. 6 is a side view of the FIG. 5 pack when looking on to the front left-hand surface shown in FIG. 5.
Figure 9:
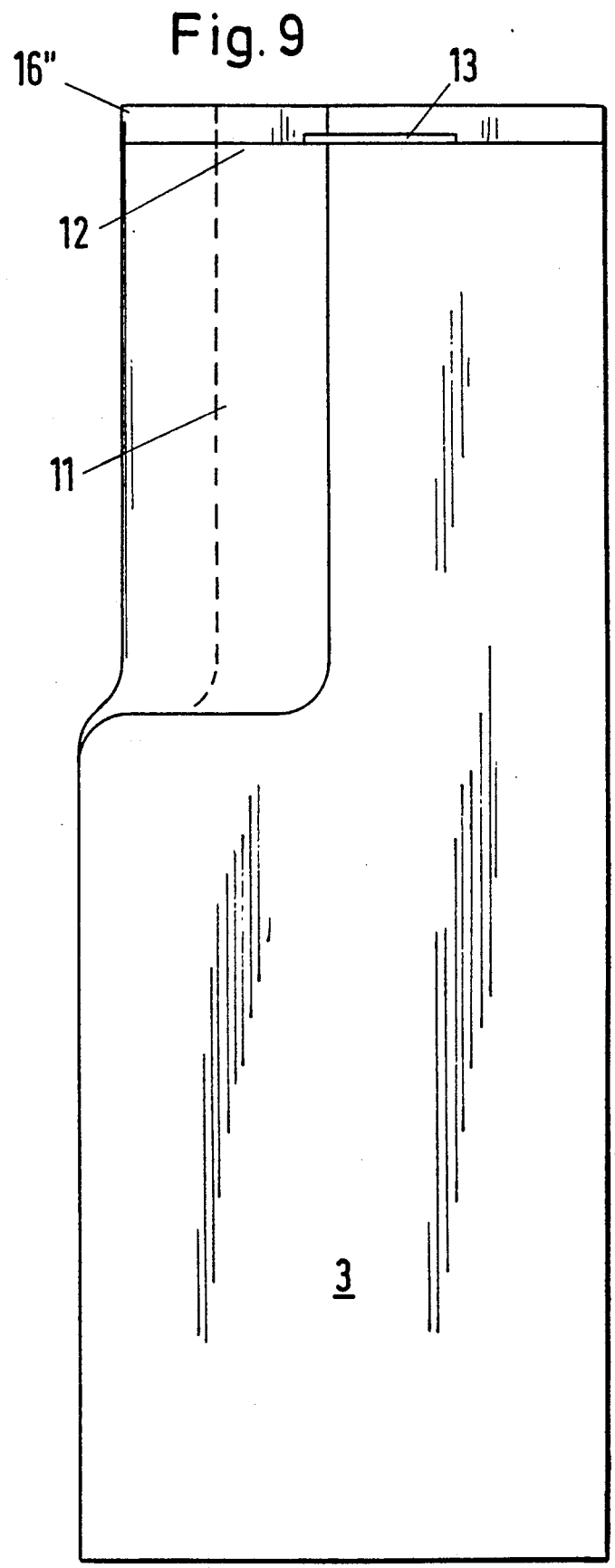
FIG. 9 is a side view of the pack shown in FIG. 8 when viewing on to the left-hand surface in FIG. 8.
Figure 10:
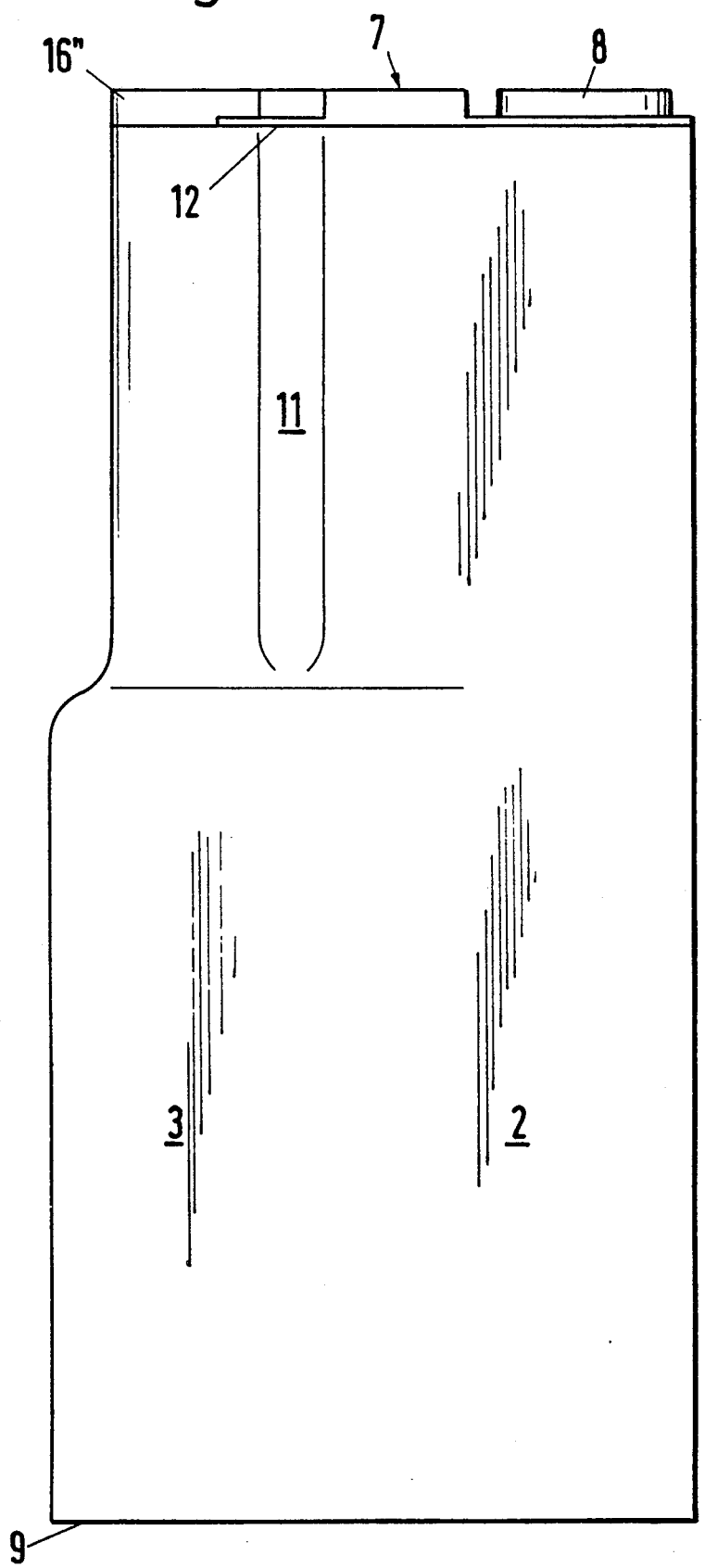
FIG. 10 is a side view of the pack when viewing in the direction of the diagonal which in FIG. 8 lies in the direction of view.
Figure 11:
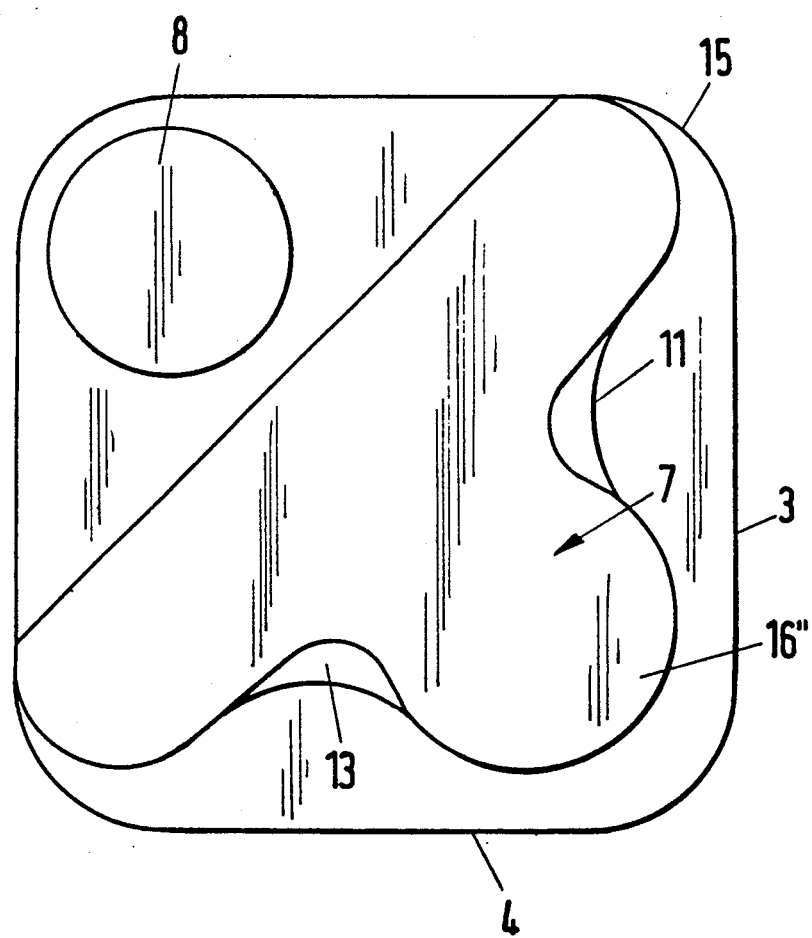

The handle which is generally identified by reference numeral 10 does not have any part thereof projecting beyond the parallelepipedic outside contour of the pack and it comprises two mutually oppositely disposed gripping troughs or recesses 11 which with their upper ends 12 adjoin edge abutments 13 which are integrally injection-moulded on the edge of the top 7. They project radially outwardly out of the arcuate depression 14 of the top 7 in a crescent moon-like configuration in the direction of the plane of the top without thereby projecting beyond the overall outside contour of the pack and preferably even only reaching that contour. It will be seen from the plan views of the three embodiments shown in FIGS. 4, 7 and 11 that the corners 15 of the respective top 7 are predominantly rounded off. It is only in the embodiment shown in FIG. 4 that a point 16 is disposed at the front beside the pouring means 8 while the rear point 16' is arranged in diagonally opposite relationship. In the embodiment shown in FIG. 7 the top 7 is even of a part-circular rounded configuration in the rearward region so that it is already almost not possible to talk of a rounded-off corner 15. Disposed within that rounded configuration is the support pillar 17 which is substantially beneath the rear corner 16' or 16" respectively. In the embodiment shown in FIGS. 5 to 7 that 'rear corner' 16" has degenerated to a completely rounded configuration which is disposed between two correspondingly degenerated corners 15 of the top 7.

While the upper end 12 of the gripping recesses 11 is described and located hereinbefore, we are now considering the middle region 18 of the pack which is indicated in the Figures by the curved brackets. Apart from the second embodiment shown in FIGS. 5 to 7 where the rear side wall 5 is shown in a vertically upstanding configuration substantially perpendicularly to the top 7 (if the top 7 is considered as being disposed horizontally), in the other two embodiments the middle region 18 of the pack has a bend in the rear side wall 5 or in the embodiment shown in FIG. 1 there is a taper in respect of the two side walls 3 and 4 upwardly towards the top 7. If the periphery of the bottom (the sum of the four straight lines) is compared to a corresponding periphery in the upper portion of the pack of the respective embodiment, the taper configuration will be understood for it is due to the shaping of the gripping recesses 11 in the tube that a portion of the peripheral length is used up so that the same periphery can be achieved in the upper and in the lower portions of the respective pack only if, in the two embodiments shown in FIGS. 1 and 8, the rear corner 16' or 16" respectively is moved inwardly of the outside contour.

The lower ends 19 of the gripping recesses 11 are disposed in the middle region 18 of the pack. They are produced by thermoplastic deformation. In the embodiment shown in FIGS. 8 to 11, even the regions beside those lower ends 19 are shaped into a step configuration disposed in the side walls 3 and 4.

What is claimed is:

1. A pack for flowable materials, comprising
   a tubular body (1) a plastics foil formed into a plurality of joined side walls (2, 3, 4) having upper (6) and lower edges,
   said lower edges of said side walls being formed into a bottom (9),
   said upper edges (6) of said side walls having a molded plastic top (7) joined thereto,
   said top including a pouring means (8) located over an upper edge of at least one of said side walls and defining the front of the pack,
   a pair of mutually oppositely disposed gripping recesses (11) formed in two (3, 4) of said side walls spaced from the front of the pack and extending from adjacent said upper edges thereof substantially to the middle (18) of the pack,
   said two walls (3, 4) defining between said gripping recesses (11) a pillar (17) located opposite from said pouring means (8),
   the peripheral shape of said top corresponding generally to the cross-section of the pack at said upper edges, and
   said recesses (11) cooperating with said pillar (17) to form a handle integral with the upper portion of the tubular body (1) opposite from said pouring means (8) and arranged within the outside contour of the pack.

2. A pack as defined in claim 1, wherein said gripping recesses (11) are partial cylindrical surfaces formed inwardly of said two side walls (3, 4).

3. A pack as defined in claim 1, wherein
   said top (7) is substantially quadrangular in shape,
   said pouring means (8) being located in a front corner (16) of said top and said support pillar (17) being disposed substantially beneath the opposite rear corner (16', 16") of said top.

4. A pack as defined in claim 1, wherein
   said top (7) is substantially quadrangular in shape,
   said pouring means (8) being located in said top above the front side wall (2) and said support pillar (17) being disposed substantially beneath said other side walls (3, 4, 5) opposite said front side wall (2).

5. A pack as defined in claim 3, wherein
   the corners (15', 16") of said top (7) are rounded off.

6. A pack as defined in claim 1, wherein
   said top (7) is a substantially rigid member injection molded to said upper edges of said tubular body.

7. A pack as defined in claim 6, further including an edge abutment (13) integrally mounded onto the edge of the top (7) at the upper end (12) of at least one gripping recess (11).

8. A pack according to claim 1, wherein the periphery of said top (7) is substantially the same length as the periphery of said bottom (9).

9. A pack as defined in claim 1, wherein said recesses (11) extend to said upper edges of said two side walls (3, 4) forming crescent-like configurations in said upper side edges.

* * * * *